United States Patent [19]

Sturgeon et al.

[11] Patent Number: 4,605,362
[45] Date of Patent: Aug. 12, 1986

[54] ROTARY COMPRESSOR AND METHOD OF ASSEMBLY

[75] Inventors: Gerald E. Sturgeon; Robert I. Derman, both of Louisville, Ky.

[73] Assignee: General Electric Company, Louisville, Ky.

[21] Appl. No.: 745,561

[22] Filed: Jun. 17, 1985

[51] Int. Cl.⁴ .................... F04C 29/00; B23P 15/00; B23K 9/18; B23K 31/02

[52] U.S. Cl. ..................................... 418/63; 417/902; 29/156.4 R; 29/434; 29/DIG. 38; 29/DIG. 48; 228/179; 228/184; 219/73

[58] Field of Search .................. 418/63, 243–251; 417/902; 29/156.4 R, 434, DIG. 38, DIG. 48, 73; 228/174, 179, 184

[56] References Cited

U.S. PATENT DOCUMENTS

| | | | |
|---|---|---|---|
| 3,555,320 | 1/1971 | Johnson | 310/89 |
| 3,844,685 | 10/1974 | Eickmann | 417/204 |
| 3,865,520 | 2/1975 | Kramer et al. | 418/82 |
| 4,250,423 | 2/1981 | Linscott, Jr. | 310/258 |
| 4,455,129 | 6/1984 | Sakitani et al. | 418/82 |

FOREIGN PATENT DOCUMENTS 57-102594  6/1982  Japan ..................... 418/63

*Primary Examiner*—John J. Vrablik
*Attorney, Agent, or Firm*—Frederick P. Weidner; Radford M. Reams

[57] ABSTRACT

A rotary compressor of the type having an outer metal cylinder casing, a metal cylinder with a vane slot and a vane and the method of assembling the compressor by forming the cylinder with a circular chamber, the center of which is in alignment with the central axis of the cylinder and having a circular outer wall slightly smaller than the inside diameter of the casing. A vane slot is cut in the cylinder which slot is open at one end into the chamber. A vane is placed in the slot to divide the chamber into a high pressure side and a low pressure side. The cylinder has formed therein three curved elongated ports spaced from each other in the cylinder between the chamber and outer wall. The length of each port and thickness of the metal between the port and outer wall of the cylinder cooperate to provide adequate strength for welding and sufficiently flexible to absorb any significant distortion forces caused by welding without transmitting the distortion forces to the vane slot. The cylinder outer wall is welded to the casing adjacent the three ports. Additionally, there may be a fourth weld located from 5° to 15° from a diameter line of the cylinder passing through the center of the vane slot and central axis of the cylinder on the high pressure side of the cylinder chamber.

18 Claims, 8 Drawing Figures

ROTARY COMPRESSOR AND METHOD OF ASSEMBLY

BACKGROUND OF THE INVENTION

The present invention relates to rotary compressors and their method of assembly wherein the vane slot is prevented from being distorted during the welding operation of the compressor cylinder to the compressor outer metal casing.

Rotary compressors include a hermetic outer metal casing in which there is disposed a refrigerant compressor unit having an angular chamber or compression chamber defined within a cylinder. Disposed for rotation within the chamber is a roller which is driven by an eccentric formed as an integral part of a drive shaft extending from a motor. The cylinder has a radial vane slot open at one end into the chamber and has disposed therein a vane which is spring biased into engagement with the roller thereby dividing the chamber into a low and high pressure side. It is important for compressor efficiency and noise reduction that the tolerances of the vane slot be held to a minimum. During assembly of the compressor the cylinder is placed inside the metal casing and a welding operation through the outer case joins the casing to the cylinder. During the welding operation and subsequently during cooldown distortion forces are set up which, if not controlled, will distort the vane slot and adversely affect the minimum tolerance dimensions of the vane slot thereby detrimentally affecting the efficiency of the rotary compressor and the introduction of noise during the compressor operation.

By this invention there is provided a rotary compressor and method of assembly that prevents distortion of the vane slot as a result of the welding operation of the casing to the cylinder.

SUMMARY OF THE INVENTION

There is provided a rotary compressor and method of assembly of the type having an outer metal cylindrical casing, a metal cylinder having a vane slot and a vane. The method of assembly includes forming the cylinder as viewed in top plan view with a circular chamber, the center of which is in alignment with the central axis of the cylinder and having a circular outer wall slightly smaller than the inside diameter of the casing. A vane slot is cut in the cylinder which slot is open at one end into the chamber. A vane is placed in the vane slot to divide the chamber into a high pressure side and a low pressure side. The cylinder has formed therein three curved elongated ports spaced from each other and located between the chamber and outer wall, the length of each port and thickness of the metal between the port and outer wall of the cylinder cooperating to provide adequate strength for welding and sufficiently flexible to absorb any distortion forces caused by welding without transmitting any significant distortion forces to the vane slot. The cylinder and casing are welded adjacent the three ports. Additionally, there may be a fourth weld located from 5° to 15° from a diameter line of the cylinder passing through the center of the vane slot and central axis of the cylinder on the low pressure side of the cylinder chamber. The fourth weld location also prevents distortion of the vane slot as a result of the welding operation and has the effect of adding some additional structural rigidity between the casing and the cylinder supporting the rest of the internal compressor components and reduces structure borne noise during operation of the compressor.

BRIEF DESCRIPTION OF THE DRAWINGS

FIG. 3 is a schematic of a refrigeration system utilizing a rotary compressor embodying the present invention.

DESCRIPTION OF THE PREFERRED EMBODIMENT

Figure 1:
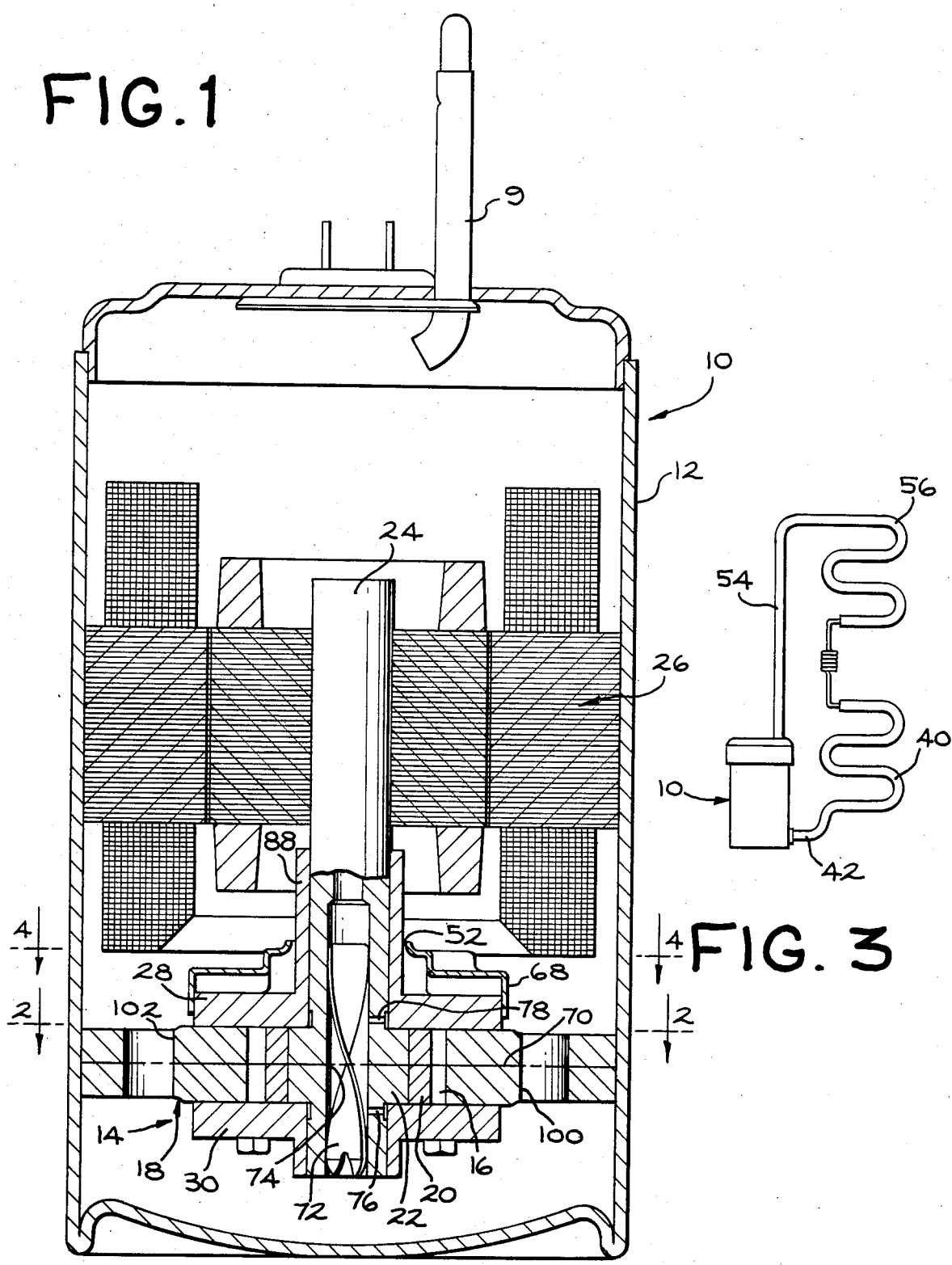
FIG. 1 is a cross-section elevational view of a rotary compressor embodying the present invention.

Referring to FIG. 1, there is shown a hermetic compressor 10 including a hermetic casing 12 made of cold rolled draw quality aluminum killed steel having a thickness of from 0.105 to 0.128 inches in which there is disposed a refrigerant compressor unit 14 having an angular chamber or compressor chamber 16 defined within a cylinder 18. Disposed for rotation within the chamber 16 is a roller 20 which is driven by an eccentric 22 formed as an integral part of the drive shaft 24 extending downwardly from the motor 26. A hollow bearing journal 88 formed in the supporting main frame 28, supports the shaft 24 above the eccentric 22 for rotation by the motor 26. It should be noted that the upper end wall enclosing the angular compressor chamber 16 is provided by the main frame 28. The opposite or lower end wall 30 encloses the bottom of the compressor chamber 16 and also supports the lower end of the shaft 24. Cylinder 18, welded to the casing 12, supports the compressor unit 14 within the hermetic casing 12. It is this aspect of the construction of a rotary compressor to which this invention relates and it will be discussed in detail following a general description of the entire compressor and its operation.

Figure 2:
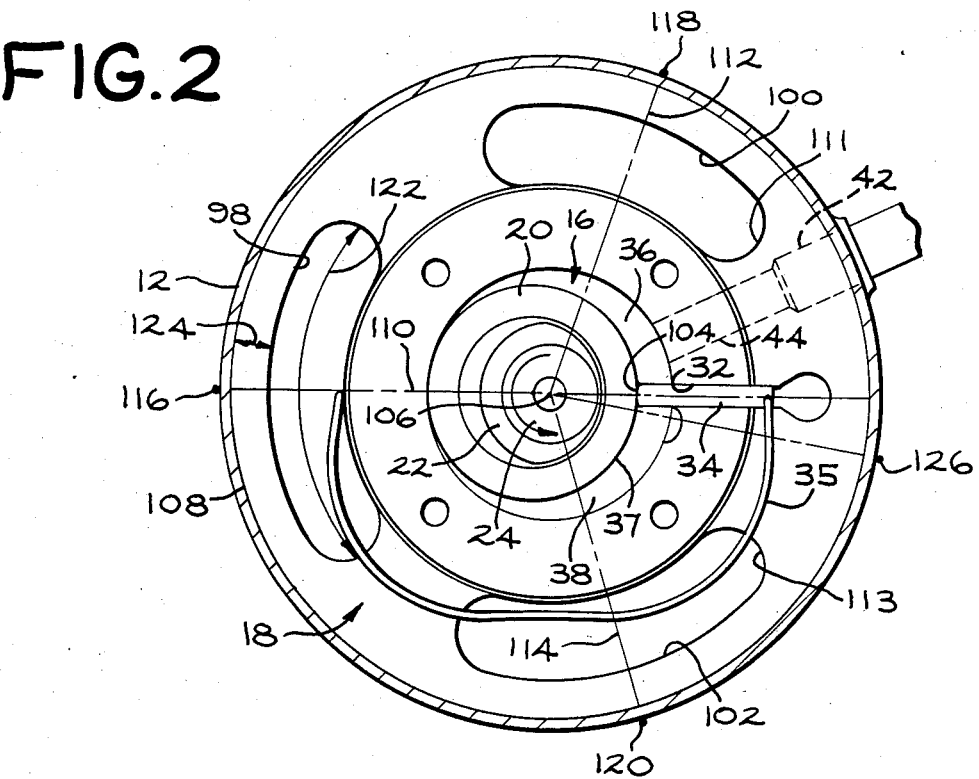
FIG. 2 is a top plan view of a portion of the rotary compressor embodying the invention taken along line 2—2 of FIG. 1.
Figure 4:
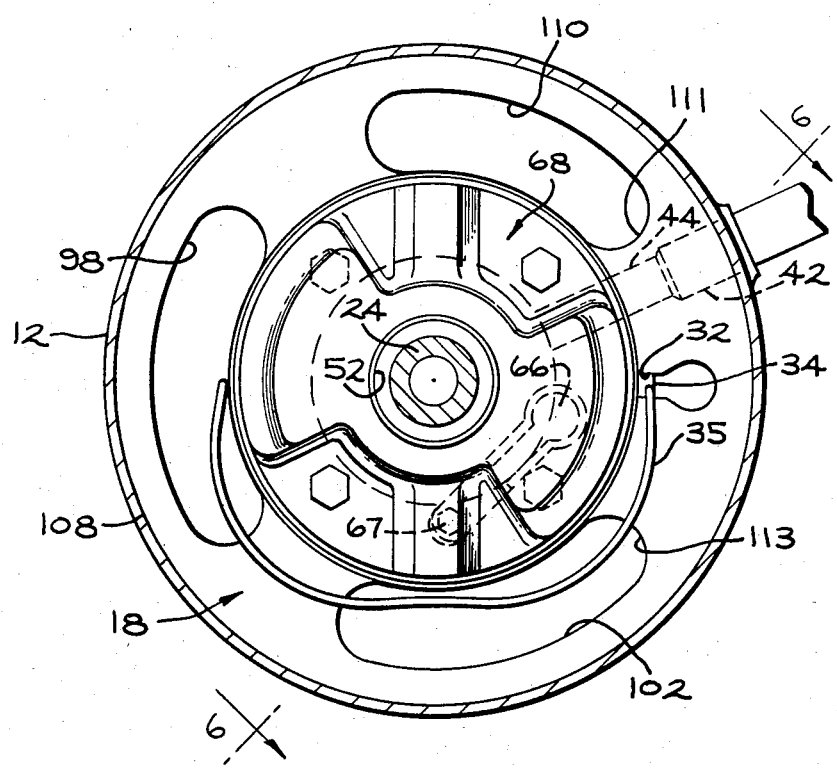
FIG. 4 is a top plan view of a portion of the rotary compressor shown in FIG. 1 taken along line 4—4 of FIG. 1.
Figure 5:
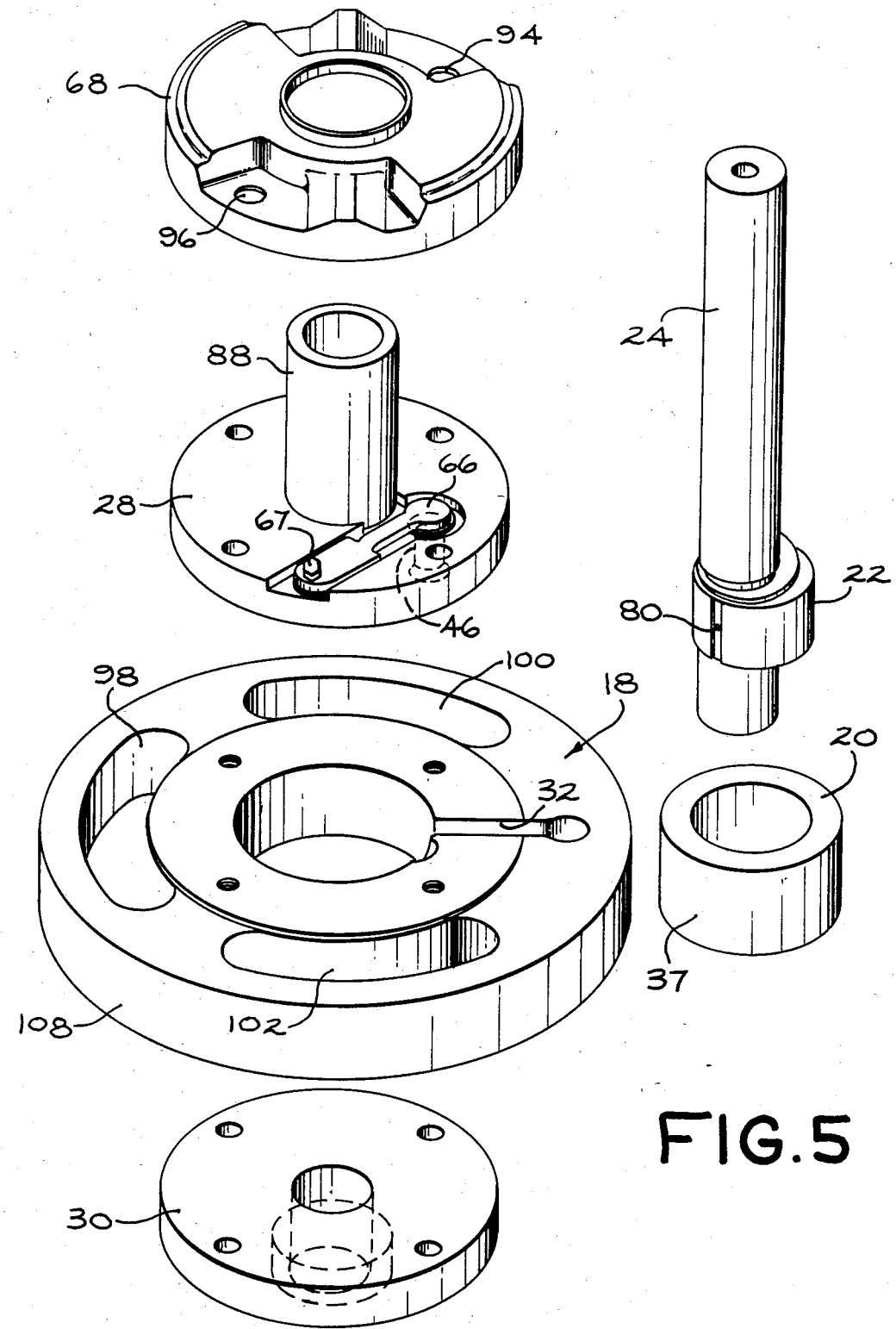
FIG. 5 is a perspective exploded view of a portion of the rotary compressor embodying the present invention.

As may best be seen in FIGS. 2 and 5, the cylinder 18 is provided with a radial vane slot 32 having slidably disposed therein a blade or vane 34 which is biased by a spring 35 into engagement with the peripheral surface 37 of the roller 20 thereby dividing the chamber 16 into a low and high pressure side designated as 36 and 38 respectively. As shown in FIG. 2, the shaft 24 and therefore the eccentric 22 and roller 20 are rotatable in a counter clockwise direction as indicated by the arrow.

As may be seen in FIG. 3, the hermetic compressor 10 is adapted to be connected into a refrigeration system to receive suction or low pressure gas from an evaporator 40 through a suction line 42. Means are provided for delivering the suction gas into the low pressure side 36 of the chamber 16 from the suction line 42. More specifically, referring to FIG. 2, these means include a channel 43 having an inlet area 44 formed or bored through the side of the cylinder 18 and communicating with the compressor chamber 16. The inlet area 44 delivers low pressure gas into the low pressure side 36 of the compression chamber 16 where it is compressed between the peripheral surface of the roller 20, the sides of the angular chamber 16, and the high pressure side of the vane 34, during rotation of the roller 20 around the chamber.

Figure 6:
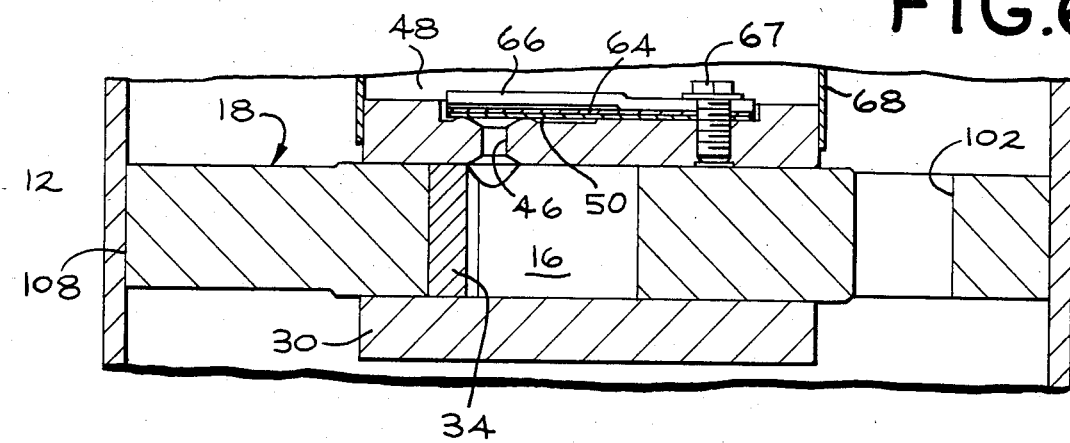
FIG. 6 is a portion of the rotary compressor embodying the present invention taken along line 6—6 of FIG. 4.

As best seen in FIGS. 5 and 6, means, including a discharge port 46 and discharge chamber 48, are provided for discharging the high pressure gas from the high pressure side 38 of the angular chamber 16 into the hermetic casing 12. Mounted within the discharge chamber 48 is a suitable valve 50 for assuring proper compression of the gas issuing through the discharge port 46 and preventing reverse flow of gas back into the compressor chamber 16. The valve 50 has on top of it a valve spring 64 that is spring biased in the direction of the valve 50 to close the valve once the high pressure gas is exhausted from the high pressure side 38 of the chamber 16. Above or overlying the valve spring 64 is a rigid valve stop 66 that acts to prevent excess upward movement of the valve 50 and valve spring 64 during exhausting of the high pressure gas. All of these components 50, 64 and 66 are secured to the main frame 28 by a bolt 67.

The high pressure exhaust gas passing through the discharge port 46 enters the muffler 68. The muffler 68 is utilized to reduce noise of the high pressure gas passing from the compressor unit 14 into the compressor casing 12 and out the outlet 9. For that purpose there is employed a metal cup having the configuration particularly noted in FIG. 5. There is an opening in the center of the muffler that is larger than the upstanding bearing journal 88 of the main frame 28 so that there is a space or passage 52 between the opening in the muffler and the bearing journal 88 to allow the high pressure gas to escape therethrough. The muffler 68 is secured to the main frame 28 by bolts through holes 94 and 96 in the muffler into corresponding holes in the main frame. In operation then as the high pressure gas is exhausted from the compressor unit through the discharge port 46, it passes through the discharge port 46 by raising the valve 50 and allowing the gas to pass into the interior of the muffler 68 whereupon it takes a path around the muffler causing the gas flow noise to be deadened and then eventually passes up through the opening 52 and up through the motor portion of the compressor and out the discharge outlet 9. Any oil that may be mixed with the high pressure gas is separated during this gas flow and will be returned into the underlying oil pool usually through the three curved ports 98, 100 and 102 in the cylinder 18. After flowing upwardly over the motor 26 the high pressure gas is conducted out of the hermetic casing 12 through a suitable discharge means or outlet 9 in the upper end of the case and through a discharge line 54 shown in FIG. 3 into the condenser 56 where the heat absorbed by the refrigerant in the other portions of the system is abstracted. As the gas in the condenser 56 is cooled it condenses so that the refrigerant in the latter stage of the condenser is therefore largely in liquid form.

Within the compressor casing 12 and particularly as shown in FIG. 1 there is a pool of oil the level of which is indicated as line 70 when the compressor is oriented in the vertical direction. The oil is to lubricate the moving parts of the compressor unit 14. In FIG. 1 one means of delivering oil from the pool of oil is a twisted paddle 72 inserted into a bore 74 in the lower part of the drive shaft 24. As the drive shaft 24 is rotated, the paddle is rotated with it and oil is delivered up the interior side wall of the bore 74 and by centrifugal force is forced out through oiling ports 76 and 78 to the moving surfaces of the compressor unit 14. In addition and as can be best seen in FIG. 5 there is also an oiling port 80 in the outer surface of the eccentric 22.

It will be appreciated from the foregoing that the moving component parts of the compressor need to be held to tight tolerances so that the operation of the compressor is as efficient as possible and also that the moving parts do not produce objectionable noise during operation of the compressor. One of the critical areas regarding tolerance is the vane slot 32 which has in it the reciprocating vane 34. The vane slot is cut into the cylinder 18 and must maintain its critical dimensions throughout the length and height of the slot so that the vane may move back and forth within the slot in the exact manner for which it was designed as the roller 20 rotates within the chamber 16. It will be noted particularly in FIG. 2 that the forward terminal end 104 of the vane 34 rides on the peripheral surface 37 of roller 20 and because of its eccentric motion causes the vane to reciprocate within the vane slot.

It is common practice in the manufacturing and assembling of rotary compressors to have the casing 12 welded to the cylinder 18 after the compressor unit is placed inside the casing 12. For this purpose then the outside diameter of the cylinder 18 is slightly smaller than the inside diameter of casing 12 so that the entire compressor unit 14 may be slipped inside the casing. When the compressor unit 14 is located properly within the casing 12 there is usually a welding operation from outside the casing that welds the casing 12 to the cylinder 18. Welding operations can exert forces on the components inside the casing 12 as a result of the welding operation because the parts are metal and welding necessarily includes a high heating operation with a cooldown thereafter. It has been found that this welding operation can, because of the forces generated, distort the dimensions of the vane slot, either closing the vane slot or opening it slightly, which will reduce the compressor efficiency and also contribute to noise during operation of the compressor. The welding operation may be a metal inert gas spot weld utilizing a submerged arc with a molten puddle using a low carbon welding wire of 30 to 35 thousands inch in diameter for welding the casing 12 to the cylinder 18. The spot welds may be done simultaneously.

By this invention there is provided a rotary compressor and method of assembly using a welding operation without distorting the vane slot. This is accomplished by forming the cylinder 18 as viewed in top plan view shown in FIG. 2 with a chamber 16, the center of which is in alignment with the central axis 106 of the cylinder which as indicated before has a circular outer wall 108 slightly smaller than the inside diameter of the casing 12. The cylinder 18 has formed therein three curved elongated ports 98, 100, and 102. Port 98 is centered on a diameter line 110 of the cylinder 18, which diameter line passes through the center of the vane slot 32 and central axis 106 of the cylinder. Ports 100 and 102 are located on opposite sides of the diameter line 110 with their respective termination points 111 and 113 equal distant from the vane slot 32. Ports 100 and 102 have their transverse center lines 112 and 114 respectively located between 96° and 116° from where diameter line 110 passes through port 98. The spot welding of the casing 12 to the cylinder 18 will take place adjacent the three ports. Preferably the welding will be at points 116, 118 and 120, which are the tranverse center lines of ports 98, 100 and 102 respectively.

It has been found that by adjusting the arcuate length designated 122 (FIG. 2) of each port 98, 100 and 102 and the thickness of the metal between the ports and outer wall 108 of the cylinder, which thickness is designated 124 in FIG. 2, that there is provided adequate strength for welding the cylinder 18 to the casing 12 yet there is sufficient flexibility to absorb any distortion forces caused by the welding operation without transmitting any significant distortion forces to the vane slot. As an example, we have found that a metal cylinder 18 formed to have a diameter of approximately 4.40 inches (111.76 mm), a thickness of approximately 0.65 inches (16.51 mm), with the compressor chamber 16 having a diameter of 1.67 inches (42.42 mm), a vane slot width of 0.16 inches (4.06 mm) and a length of 1.02 inches (25.91 mm), and the three ports each having a length 122 of between 1.61 (40.89 mm) and 2.26 (57.40 mm) inches, and the thickness 124 of the metal between each port and the outer wall 108 of the cylinder being approximately 0.33 inches (8.38 mm) produces no significant distortion to the vane slot as a result of the welding operation.

Figure 7:
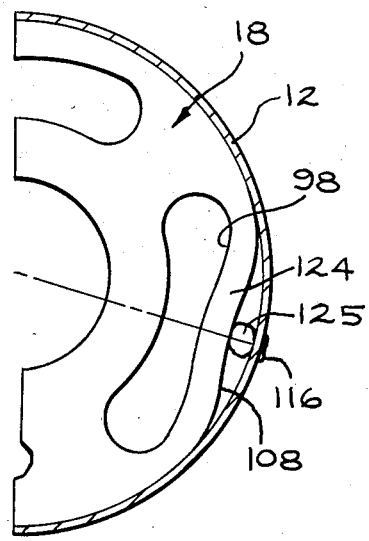
FIG. 7 is a portion of the rotary compressor casing and cylinder showing the distortion of the outer rim of a cylinder port as a result of welding embodying the present invention.

With reference to FIG. 7, there is shown results of the welding operation as described above. While the casing 12 remains essentially cylindrical the location of the weld nugget 125 at point 116, which is the result of solidification of the molten metal and welding wire from the MIG spot weld operation, adjacent port 98 of cylinder 18 shows the inward deflection of the thickness of metal or rim 124 between the port 98 and the cylinder outer wall 108. By this deflection the distortion forces of the welding operation are absorbed and not transmitted beyond the area of the port in the thickness of metal 124 between the port 98 and outer wall 108.

Figure 8:
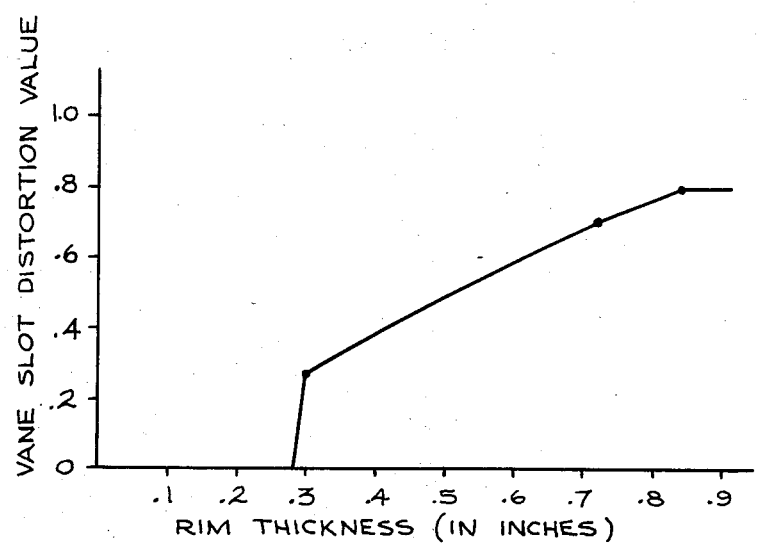
FIG. 8 is a graph showing vane slot distortion values relative to cylinder outer rim thickness of a rotary compressor.

With reference to FIG. 8, there is shown the relationship of the vane slot distortion value, that is the amount of distortion at the vane slot, relative to the rim thickness of the metal 124 between the ports 98, 100, 102 and the outer wall 108. As can be seen, the vane slot distortion increases quite rapidly beyond 0.3 inch (7.62 mm) thickness. While distortion of the vane slot is even less below 0.3 inches (7.62 mm) the lesser rim thickness must be balanced against having sufficient thickness for adequate strength to support welding the cylinder 18 to the casing 12.

While three spot welds as described above are quite suitable to achieve the desired results, it has been found desirable to add a fourth weld to increase the strength of the joint between the casing 12 and the cylinder 18 and help reduce noise level during operation of the compressor. It has been found that noise is sensitive to the clearance between the casing 12 and the cylindrical outer wall 108 of the cylinder 18 such that when the clearance is smaller the noise is less; therefore, by holding the casing and cylinder as firmly together as possible structure borne noise will be reduced during operation of the compressor. The fourth location 126 (FIG. 2) of the weld should be from 5° to 15° and preferably approximately 10° from the diameter line 110 passing through the center of the vane slot and central axis of the cylinder on the high pressure side 38 of the cylinder chamber 16. By locating the spot weld at that location the vane slot is not distorted as a result of the welding operation.

While there has been shown and described a specific embodiment of the invention, it will be understood that it is not limited thereto and it is intended by the appended claims to cover all such modifications as fall within the true spirit and scope of the invention.

What is claimed is:

1. In a rotary compressor of the type having an outer metal cylindrical casing, a cylinder as viewed in top plan view with a circular chamber the center of which is in alignment with the central axis of the cylinder and having a circular outer wall slightly smaller than the inside diameter of the casing, a vane slot in the cylinder open at one end into the chamber, a vane in the vane slot to divide the chamber into a high pressure side and a low pressure side, wherein the improvement comprises:

three curved elongated ports spaced from each other in the cylinder between the chamber and outer wall, the length of each port and thickness of the metal between the port and outer wall of the cylinder cooperating to provide adequate strength for welding and sufficiently flexible to absorb any distortion forces caused by welding without transmitting any significant distortion forces to the vane slot, and welds joining the cylinder outer wall to the casing, said welds being adjacent the three ports.

2. In the rotary compressor as recited in claim 1 wherein a first one of the ports is centered on a diameter line of the cylinder passing through the center of the vane slot and central axis of the cylinder and the second and third ports are located on opposite sides of said diameter line.

3. In the rotary compressor as recited in claim 2 wherein the transverse center lines of the second and third ports are between 96° and 116° from where said diameter line passes through the first one of the ports.

4. In the rotary compressor as recited in claim 3 wherein the welds are in alignment with the transverse center line of each port.

5. In the rotary compressor as recited in claim 1 and further including a weld joining the cylinder outer wall to the casing at a fourth location of from 5° to 15° from a diameter line of the cylinder passing through the center of the vane slot and central axis of the cylinder on the high pressure side of the cylinder chamber.

6. In the rotary compressor as recited in claim 1 wherein the weld is the result of a metal inert gas submerged arc spot weld.

7. In the rotary compressor as recited in claim 1 wherein the metal cylinder has a diameter of 4.40 inches, a thickness of 0.65 inches and the three ports each have a length of between 1.61 and 2.26 inches and the thickness of the metal between each port and the outer wall of the cylinder is approximately 0.33 inches.

8. The method of assembling a rotary compressor of the type having an outer metal cylindrical casing, a metal cylinder with a vane slot and a vane which comprises:

forming the cylinder as viewed in top plan view with a circular chamber the center of which is in alignment with the central axis of the cylinder and having a circular outer wall slightly smaller than the inside diameter of the casing, cutting a vane slot in the cylinder, said vane slot being open at one end into the chamber, placing a vane in the vane slot to divide the chamber into a high pressure side and a low pressure side, forming three curved elongated ports spaced from each other in the cylinder between the chamber and outer wall, the length of each port and thickness of the metal between the port and outer wall of the cylinder cooperating to provide adequate strength for welding and sufficiently flexible to absorb any distortion forces caused by welding without transmitting any significant distortion forces to the vane slot, and welding the cylinder outer wall to the casing adjacent the three ports.

9. The method of assembling a rotary compressor in accordance with claim 8 wherein a first one of the ports is centered on a diameter line of the cylinder passing through the center of the vane slot and central axis of the cylinder and the second and third ports are located on opposite sides of said diameter line.

10. The method of assembling a rotary compressor in accordance with claim 9 wherein the transverse center lines of the second and third ports are between 96° and 116° from where said diameter line passes through the first one of the ports.

11. The method of assembling a rotary compressor in accordance with claim 10 wherein the welding is in alignment with the transverse center line of each port.

12. The method of assembling a rotary compressor in accordance with claim 8 and further including welding the cylinder outer wall to the casing at a fourth location of from 5° to 15° from a diameter line of the cylinder passing through the center of the vane slot and central axis of the cylinder on the high pressure side of the cylinder chamber.

13. The method of assembling a rotary compressor in accordance with claim 8 wherein the welding is accomplished by a metal inert gas submerged arc spot weld.

14. The method of assembling a rotary compressor in accordance with claim 13 wherein the spot welds are done simultaneously.

15. The method of assembling a rotary compressor in accordance with claim 8 wherein the metal cylinder is formed to have a diameter of approximately 4.40 inches, a thickness of approximately 0.65 inches and the three ports each have a length of between 1.61 and 2.26 inches and the thickness of the metal between each port and the outer wall of the cylinder is approximately 0.33 inches.

16. The method of assembling a rotary compressor of the type having an outer metal cylindrical casing, a metal cylinder with a vane slot and a vane which comprises:

forming cylinder as viewed in top plan view with a circular chamber the center of which is in alignment with the central axis of the cylinder and having a circular outer wall slightly smaller than the inside diameter of the casing, said cylinder having a diameter of approximately 4.40 inches and a thickness of approximately 0.65 inches, cutting a vane slot in the cylinder, said vane slot being open at one end into the chamber, placing a vane in the vane slot to divide the chamber into a high pressure side and a low pressure side, forming three curved elongated ports spaced from each other in the cylinder between the chamber and outer wall, each port having a length of between 1.61 and 2.26 inches and the thickness of the metal between the port and outer wall of the cylinder is approximately 0.33 inches, a first one of the ports being centered on a diameter line of the cylinder passing through the center of the vane slot and central axis of the cylinder and the second and third ports being located on opposite sides of said diameter line and having the transverse center lines of the second and third ports between 96° and 116° from where said diameter line passes through the first one of the ports, and welding the cylinder outer wall to the casing in alignment with the transverse center line of each port.

17. The method of assembling a rotary compressor in accordance with claim 16 wherein the welding is accomplished by a metal inert gas submerged arc spot weld.

18. The method of assembling a rotary compressor in accordance with claim 17 wherein the spot welds are done simultaneously.

* * * * *